United States Patent [19]

Orr et al.

[11] Patent Number: 4,751,094
[45] Date of Patent: * Jun. 14, 1988

[54] METHOD FOR SLICING FRUITS AND VEGETABLES

[75] Inventors: Avigdor Orr, Highland Park; John O. Spingler, Plainsboro, both of N.J.

[73] Assignee: DNA Plant Technology Corp., Cinnaminson, N.J.

[*] Notice: The portion of the term of this patent subsequent to Dec. 8, 2004 has been disclaimed.

[21] Appl. No.: 792,439

[22] Filed: Oct. 29, 1985

[51] Int. Cl.⁴ .................................... A23L 1/212
[52] U.S. Cl. ............................ 426/481; 99/516; 426/518
[58] Field of Search .............. 426/518, 481; 99/516; 83/53, 177, 884

[56] References Cited

U.S. PATENT DOCUMENTS

| | | | |
|---|---|---|---|
| 2,018,926 | 10/1935 | Schroepter | 299/17 |
| 2,437,637 | 3/1948 | Bridge | 99/545 |
| 3,351,113 | 11/1967 | Suzuki et al. | 83/177 |
| 3,526,162 | 9/1970 | Willcox | 83/177 |
| 3,704,966 | 12/1972 | Beck | 417/490 |
| 3,811,795 | 5/1974 | Olsen | 417/397 |
| 4,152,958 | 5/1979 | Bogert | 83/177 |
| 4,157,681 | 6/1979 | Akesson, et al. | 99/538 |
| 4,246,838 | 1/1981 | Pulver et al. | 99/516 |
| 4,496,515 | 1/1985 | Ptasienski et al. | 264/504 |

FOREIGN PATENT DOCUMENTS

| | | | |
|---|---|---|---|
| 39958 | 11/1981 | European Pat. Off. | |
| 2433453 | 3/1980 | France | |
| 1460711 | 1/1977 | United Kingdom | 83/177 |
| 2042398A | 9/1980 | United Kingdom | 83/177 |

*Primary Examiner*—George Yeung
*Attorney, Agent, or Firm*—Pennie & Edmonds

[57] ABSTRACT

An improved method of slicing fresh fruits and vegetables utilizing a high pressure fluid jet that minimizes bruising throughout the cut pieces and tissue damage in the vicinity of the cut surface.

4 Claims, No Drawings

METHOD FOR SLICING FRUITS AND VEGETABLES

BACKGROUND OF THE INVENTION

1. Field of the Invention

This invention relates to a novel method of slicing fresh fruits and vegetables. More particularly, it relates to slicing fresh fruits and vegetables utilizing a high pressure fluid jet to minimize tissue damage along the cut.

2. Description of the Prior Art

The use of fluid jets as a means of cutting, drilling or abrading various materials has long been known in the art. For example, there is the practice of hydraulic mining where a high pressure fluid jet is used to cut through rock formations, coal formations or the like. Representative of the prior art in this field is exemplified by the following patents: U.S. Pat. No. 878,208 to Kirschniobe, U.S. Pat. No. 2,018,926 to Schroepfer, U.S. Pat. No. 3,203,736 to Anderson among many others.

Additionally, various devices are known for producing very high velocity pulsed liquid jets. One of the reasons for providing the pulsed jet is that relatively high pressures are obtainable than would otherwise be possible with comparable apparatus for steady state flow. Typical of such devices are those shown in the following patents: U.S. Pat. No. 3,704,966 to Beck for use in rock excavation, and U.S. Pat. No. 3,746,256 to Hall, et al. for use in cutting such materials as rock, metal, concrete and wood.

In recent years, there has been development work in high pressure intensifiers capable of producing a substantially constant discharge of a fluid jet stream at velocities in the order of 1,200 feet per second and substantially greater. Such a device is shown in U.S. Pat. No. 3,811,795. One of the practical applications of such a device is in jet cutting, in which a small diameter fluid jet (e.g. having a diameter between several hundredth to as small as several thousandths of an inch) is used to cut a relatively narrow kerf in a variety of materials, such as wood, fabric, sandstone, etc.

U.S. Pat. No. 4,496,515 to Pfasienski, et al. describe a method for cutting gypsum board with a high pressure and high velocity fluid cutting jet.

The cutting of fresh fruits and vegetables is generally disclosed in the prior art by several references. For instance, U.S Pat. No. 4,157,681 to Ahessun, et al. describe the use of a machine for paring fruits and vegetables. Further, U.S. Pat. Nos. 2,475,142 to Kane and 2,437,637 to Bridge describe similar type machines for paring and slicing different fruits and vegetables.

While the art has provided several methods of slicing or paring fresh fruits and vegetables as well as many uses for a high pressure fluid jet, the need still exists for a method of slicing fresh fruits and vegetables that minimizes extensive tissue damage caused by compression and tearing.

Accordingly, it is one object the present invention to utilize a high pressure fluid jet to slice fresh fruits and vegetables.

Another object of the present invention is to prolong the shelf life of fresh fruits and vegetables by minimizing excessive tissue damage caused by conventional slicing techniques.

A further object of this invention is to provide fresh fruits and vegetables in a ready-to-eat pieces and to improve the shelf life of the fresh fruits and vegetables.

The achievement of these and other objects will be apparent from the following description of the subject invention.

SUMMARY OF THE INVENTION

These and other objects are achieved by slicing a fresh fruit and vegetable utilizing a high pressure fluid jet.

In one embodiment, this invention concerns a method of slicing a fresh fruit or vegetable which comprises:

slicing the fruit or vegetable with a high pressure fluid jet in a manner that minimizes bruising throughout the cut pieces and tissue damage in the vicinity of the cut surfaces.

DESCRIPTION OF THE PREFERRED EMBODIMENTS

The present invention relates to an improved method of slicing fresh fruits and vegetables.

More particularly, this invention relates to slicing fresh fruits or vegetables with a high pressure fluid jet in a manner to minimize tissue damage and thus prolong the useful shelf life of the fruit or vegetable. By practicing the method of this invention, the useful shelf life of a fresh fruit or vegetable can be substantially lengthened.

The basic purpose of this invention is to provide an improved method of slicing fruits or vegetables in a manner to reduce excessive tissue damage caused by compression and tearing throughout the piece and along the cut surfaces. It has been found that if the slicing of fruits and vegetables is accomplished by utilizing a high pressure fluid jet, undue cell tissue damage is minimized so that when the fruit or vegetable is subsequently eaten, it will provide substantially the same sensory qualities of appearance, odor, texture, and taste as the freshly harvested fruit or vegetable.

The vegetables which are particularly adapted to being cut by the method of the present invention are those which are collectively known as fresh root vegetables, leafy vegetables and vegetables having firm tissue. These vegetables include carrots, celery, cucumber, green pepper, lettuce, cabbage, potatoes, turnips, rutabaga, string beans, radishes, rhubarb, Swiss chard, bok choy and the like.

The fruits which are particularly adapted to being cut by the method of the present invention are citrus fruits, melons and those fruits having somewhat firm tissue. These fruits include oranges, grapefruit, lemons, limes, apples, pears, pineapples, cantaloupes, honeydew melons, watermelons and the like.

In the practice of this invention, slicing or cutting of the fruit or vegetable must be accomplished in such a manner that will minimize the tissue damage that is generally attributable to compression and tearing. Many conventional methods of slicing fruits and vegetables cause excessive damage to the tissue of the fruit or vegetable. For instance, when a fruit or vegetable is sliced with a regular kitchen paring knife, the tissue along the cut has excessive damage caused by the compression and tearing required to effect the cut. This excessive damage to the tissue causes more rapid spoilage and makes the particular fruit or vegetable less a esthetically pleasing for use as a food product. It has been found that this excessive tissue damage can be avoided by slicing the fruit or vegetable with a high pressure fluid jet. This type of slicing allows the tissue, when properly stored, to form a very thin dry layer at the cut surface which slows microbial and enzymatic damage.

A high pressure fluid jet has been found to be very useful in the practice of this invention. It is characteristic of the useful fluid jet to cut or slice a fruit or a vegetable with minimum compression damage to tissue while retaining the fresh appearance of the fruit or the vegetable. It is contemplated that any suitable fluid jet known to those skilled in the art is within the scope of this invention. It is preferred to use a water jet discharging from an orifice having a diameter of about 0.003 to about 0.012 inch employing pressures of about 30,000 psi to about 50,000 psi.

The cutting or slicing can be effected in a variety of manners, depending on whether any other processing steps are to be performed before or after the cutting operation, as well as on the nature of these other operations. Thus, for example, where the fruits or vegetables are being processed, for example, for canning, dehydration or freezing in the food industry and are being conveyed by split belt conveyors, a high pressure fluid jet or a number of high pressure jets may be positioned above a conveyor so as to effect the cutting of the fruit or vegetable as it passes under the fluid jet or jets. Other individual applications of the high pressure fluid jet for cutting fruits or vegetables will be apparent to one skilled in the art depending on the particular fruit or vegetable being cut, the number of individual pieces to be processed and any other processing operations which may be involved in th particular application.

The process of this invention may usefully be employed in such aspects of the food processing industry as the canning, dehydration and freezing of fresh fruits and vegetables. One particularly useful application of the process of the present invention is disclosed in commonly assigned, copending applications filed concurrently herewith where fresh vegetables such as carrots and celery are cut into pieces, treated with water, surface dried and packaged in sealed packages to prevent undue moisture loss as measured by texture and weight loss and to prevent microbial recontamination. By employing a high pressure water jet to cut the fresh fruits and vegetables, bruising throughout the cut pieces and tissue damage in the vicinity of the cut surface are essentially avoided which adds substantially to the shelf life of these packaged vegetables.

The following examples are presented as specific embodiments of the present invention and show some of the unique characteristics of the instant process and are not to be considered as constituting a limitation on the present invention.

EXAMPLE 1

The effect of cutting techniques were evaluated.

Petioles of market mature celery were sliced utilizing a number of different cutting techniques. The cutting methods utilized the following cutting devices:
1. Regular kitchen paring knife
2. Commericial rotary blade cutter
3. Single edge razor blade
4. Razor sharp, thin blade knife
5. Water jet cutter (0.007"dia., 30,000 psi)

The sliced pieces of celery were then treated with chlorinated water (25-100 ppm) at a temperature of about 3° C for 5 minutes. Following the water treatment, the celery pieces were spun dry and packaged in foamed polypropylene.

The packaged celery was stored at 10° C. and evaluated for acceptable sensor quality and for microflora count. Samples cut with the razor sharp knife and the water jet were also stored at 3° C. The results presented in Table I show that microbial count after 16 days storage at 10° C. and the number of days storage which provided acceptable sensory quality at 10° C. and 3° C. storage temperature.

TABLE I

| Cutting Method | Microflora Count CFU/g[1] | Number of days of Acceptable Sensory Quality | |
|---|---|---|---|
| | | 10° C. | 3° C. |
| Kitchen Paring Knife (cut with pressure) | $2 \times 10^{11}$ | 12 | — |
| Commercial Rotary Blade Cutter | $4 \times 10^{11}$ | 13 | — |
| Single Edge Razor Blade | $1 \times 10^{9}$ | 24 | — |
| Razor Sharp Thin Blade Knife (cut with sawing motion, light pressure) | $1 \times 10^{6}$ | 25–40 | 61 |
| Water Jet Cutter | $5 \times 10^{7}$ | 25–40 | 61 |

[1]Colony forming units/gram

The superiority of the water jet cutter is readily apparent.

EXAMPLE 2

The effect of cutting techniques was evaluated for the processing of carrots in a fashion similar to that of Example 1.

A number of fresh carrots were washed, peeled and cut into 3" cylinders employing one of the following of cutting devices:
1. Regular kitchen paring knife
2. Commercial rotary blade cutter
3. Razor sharp, thin blade knife
4. Water jet cutter (0.007" dia. orifice, 30,000 psi)

The carrots were then cut into 3"×3/8"×3/8" sticks by pushing the 3" long cylinders through a grid of razor sharp knives. Each group of carrots was subjected to the following water treatment: A vessel containing a body of chlorinated water (25-100 ppm) and having a platform above the water was employed. The carrots were placed on the platform and a vacuum of 28 inches Hg gauge was pulled on the vessel. After five minutes the carrots were dumped into the body of water for one minute and then the vacuum was broken. The carrots were then spun dry and packaged in foamed polypropylene. The packaged carrots were stored at 10° C. and 3° C. and evaluated for sensory quality periodically to determine the number of days storage which provided acceptable shelf life. The results are presented in Table II.

TABLE II

| Effect of Cutting Method on Shelf Life of Carrot Sticks | | |
|---|---|---|
| | Days of Acceptable Sensory Quality | |
| Cutting Method | 10° C. Storage | 3° C. Storage |
| 1. Regular Kitchen Paring Knife | 40 | 50 |
| 2. Commercial Rotary Blade Cutter | 40 | — |
| 3. Razor Sharp, Thin Blade Knife (cut with sawing motion, light pressure) | 50 | 65 |
| 4. Water Jet Cutter | 60 | 70 |

These data clearly demonstrate the superiority of the water jet cutter.

Obviously, other modifications and variations of the present invention are possible in the light of the above teachings. It is therefore, to be understood that changes may be in the particular embodiments of this invention which are within the full intended scope of the invention as defined by the appended claims.

What is claimed is:

1. A method of cutting a fresh fruit or a fresh vegetable which consists essentially of:
bringing a fresh fruit or a fresh vegetable in contact with a water jet discharging from an orifice at a pressure of about 30,000 to about 50,000 psi to cut said fruit or vegetable into pieces in a manner effective to minimize bruising throughout the cut pieces and damaging of tissue in the vicinity of the cut surfaces.

2. The method according to claim 1, wherein the water jet discharges from an orifice having a diameter of about 0.003 to about 0.012 inches.

3. The method according to claim 1, wherein the vegetable is carrots.

4. The method according to claim 1, wherein the vegetable is celery.

* * * * *